United States Patent [19]

Unno et al.

[11] Patent Number: 4,549,581
[45] Date of Patent: Oct. 29, 1985

[54] FLEXIBLE PIPE

[75] Inventors: Yohei Unno, Yokohama; Satoru Ueno, Chiba; Kazuo Sadamitsu, Yamato; Tsuneo Okamoto, Hiratsuka, all of Japan

[73] Assignee: The Furukawa Electric Co., Ltd., Tokyo, Japan

[21] Appl. No.: 591,004

[22] Filed: Mar. 19, 1984

[51] Int. Cl.[4] .................................................. F16L 11/16
[52] U.S. Cl. ......................................... 138/109; 138/129; 138/130; 138/132; 138/133; 138/174; 285/149
[58] Field of Search ............... 138/129, 109, 130, 132, 138/133, 174; 285/149; 29/460

[56] References Cited

U.S. PATENT DOCUMENTS

| 1,756,698 | 4/1930 | Oden | 138/109 |
| 3,531,143 | 9/1970 | Horvath et al. | 138/109 X |
| 3,578,029 | 5/1971 | Cullen et al. | 138/133 |
| 3,874,064 | 4/1975 | Chevalier | 285/149 X |
| 3,936,118 | 2/1976 | Thiery et al. | 285/149 X |
| 4,273,160 | 6/1981 | Lowles | 138/130 X |
| 4,326,561 | 4/1982 | Kutnyak | 138/109 X |
| 4,403,631 | 9/1983 | Abdullaev et al. | 138/132 X |

FOREIGN PATENT DOCUMENTS 2217621 6/1974 France ............................. 138/133

Primary Examiner—James E. Bryant, III
Attorney, Agent, or Firm—Pearne, Gordon, Sessions, McCoy, Granger & Tilberry

[57] ABSTRACT

A flexible pipe for transporting various fluids such as oil, gas, water or the like. The flexible pipe comprises at least one internal plastic sheath which may be provided on an inner carcass, a short pitched metal armor layer provided on the internal plastic sheath to mainly share a circumferential force due to inner pressure, a long pitched metal armor layer provided on the short pitched metal armor layer to mainly share a longitudinal force and an external plastic sheath provided on the long pitched armor layer. The short pitched armor layer includes a first layer portion of metal strip having a recess provided in one surface and spirally wound with an opening of the recess outwardly directed and a second layer portion of metal strip having a recess provided in one surface and spirally wound with an opening of the recess of the metal strip for the second layer portion inwardly directed and with legs formed by the recess engaged across the recesses of adjacent turns of the metal strip for the first layer portion. The legs of the metal strips for the first and second layer portions have the facing surfaces outwardly inclined toward the opening of the recess.

13 Claims, 5 Drawing Figures

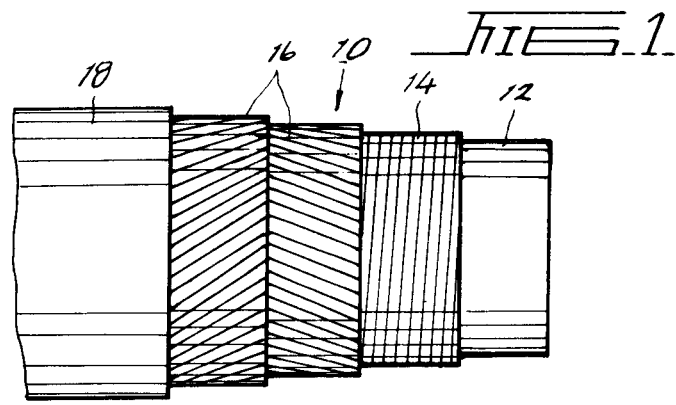
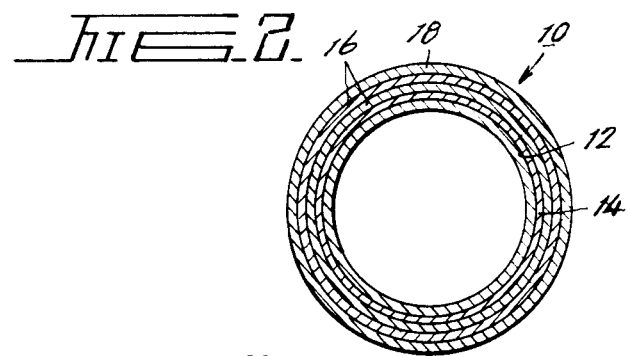
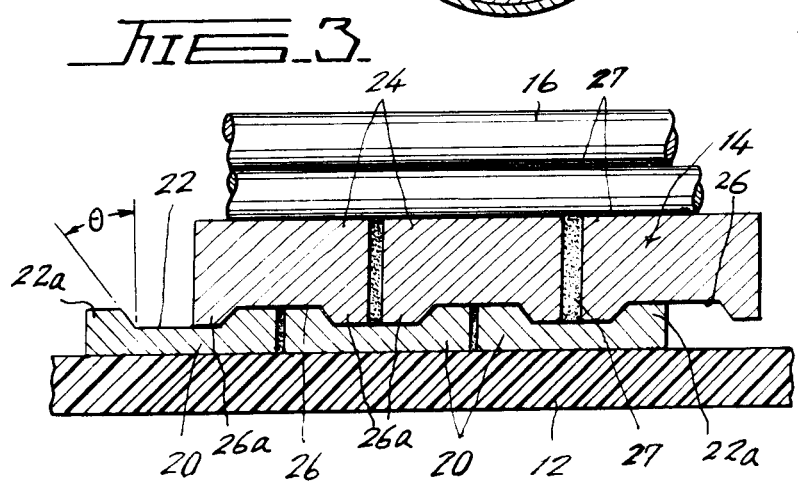

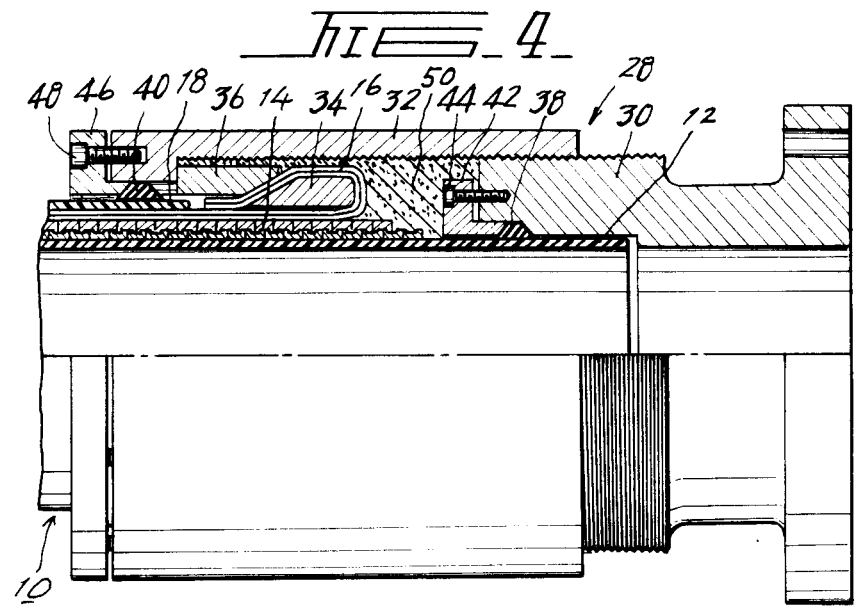
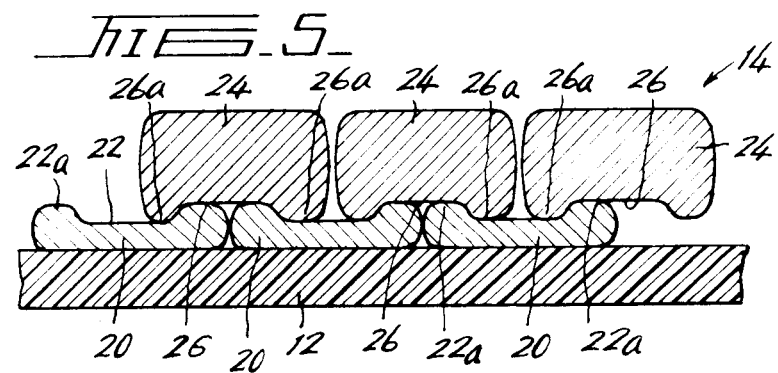

FLEXIBLE PIPE

BACKGROUND OF THE INVENTION

Various flexible pipes for transporting fluid have been proposed. One of the flexible pipes is disclosed in French Pat. No. 73.05453 (Publication No. 2,217,621) owned by Institut Francais du Petrole, des Carburants et Lubrifiants. The flexible pipel disclosed by the French patent comprises an internal plastic sheath, a short pitched armor layer provided on the internal plastic sheath, a long pitched armor layer provided on the short pitched armor layer and an external plastic sheath. The armor layers serve to bear a longitudinal tensile and a radial load on the pipeline. The short pitched armor layer comprises a steel carcass made of a plurality of legged rings which are engaged with each other so that the upper rings have their legs engaged across the adjacent lower rings. However, the prior flexible pipe has a disadvantage that assembling the legged rings is troublesome because the rings have to be separately disposed on the internal plastic sheath or on the lower rings arranged on the internal plastic sheath. In addition thereto, in the prior pipe, the rings tend to be cracked due to stress concentration at the corners of the legs because they have the legs formed at a right angle.

SUMMARY OF THE INVENTION

Accordingly, it is a principal object of the invention to provide a flexible pipe adapted to be easily assembled without damaging any flexibility, which causes the pipe to be continuously and economically produced.

It is another object of the invention to provide a flexible pipe adapted to have an armor layer which is never cracked at corners of legs thereof.

It is another object of the invention to provide a flexible pipe adapted to have an armor which is little damaged by friction.

It is another object of the invention to provide a flexible pipe adapted to have a longer life.

In accordance with the invention, there is provided a flexible pipe comprising at least one internal plastic sheath, a spiraled short pitched metal armor layer provided on said internal plastic sheath, a long pitched metal armor layer provided on said short pitched metal armor layer, and an external plastic sheath provided on said long pitched metal armor layer, said short pitched metal armor layer including a first inner layer portion of spirally wound metal strip having a recess provided in the outwardly facing surface thereof and a separate second outer layer portion of spirally wound metal strip having a recess provided in the inwardly facing surface thereof so that legs formed by said recess of said second layer portion are engaged across legs formed by recesses of adjacent turns of said first layer portion, and said legs of said metal strips for said first and second layer portions having said facing surfaces outwardly inclined toward the opening of the respective recess.

BRIEF DESCRIPTION OF THE DRAWINGS

The above and other objects and features of the invention will be apparent from the description of the embodiment taken with reference to the accompanying drawings in which;

FIG. 1 is a side elevational view of a flexible pipe constructed in accordance with an embodiment of the invention with its end exposed in a stepped manner;

FIG. 2 is a cross sectional view of the flexible pipe of FIG. 1;

FIG. 3 is an enlarged side sectional view of a portion of the flexible pipe of FIG. 1;

FIG. 4 is a side elevational view of a fitting for the flexible pipe of FIG. 1 with an upper half portion broken away;

and FIG. 5 is a sectional view of an internal plastic sheath and a short pitched armor layer of a flexible pipe constructed in accordance with another embodiment of the invention.

DETAILED DESCRIPTION OF THE EMBODIMENTS

Referring now to FIGS. 1 and 2, there is shown a flexible pipe 10 which comprises an internal plastic sheath 12 of plastic material such as polyethylene. Nylon, polyurethane, polyvinylchloride, ethylenepropylene rubber, silicone rubber, Neoprene rubber, polyester elastomer or the like, a short pitched metal armor layer 14 provided on the internal plastic sheath 12, a long pitched metal armor layer 16 provided on the short metal armor layer 14 and an external plastic sheath 18 of plastic material similar to that of the internal plastic sheath provided on the long pitched metal armor layer 16. The internal plastic sheath 12 may be provided on an inner carcass.

As noted from FIGS. 1 and 3, the long pitched metal armor layer 16 may comprise a plurality of steel wires or strips spirally wound on the short pitched metal armor layer 14 so as to have a longer pitch.

As particularly shown in FIG. 3, the short pitched metal armor layer 14 comprises a first thinner layer portion 20 of steel strip having a recess 22 provided in one surface so as to form a U-shape and a second thicker layer portion 24 of steel strip having a recess 26 provided in one surface so as to form a U-shape. The steel strip for the first layer portion 20 is spirally wound on the internal plastic sheath 12 so that the recess 22 is outwardly directed, while the steel strip for the second layer portion 24 is spirally wound on the first layer portion 20 preferably at the same pitch as that of the first layer portion so that the recess 26 is inwardly directed and so that legs 26a formed by the recess 26 are engaged across the recesses 22 of adjacent turns of the steel strip for the first layer portion 20. A gap between the adjacent turns of the second layer portion 24 may be preferably larger than a gap between the adjacent turns of the first layer portion 20. As noted from FIG. 3, the recesses 22 and 26 face each other and the legs 22a and 26a of the steel strips for the first and second layer portions 20 and 24 have the faced surfaces outwardly inclined toward the openings of the recesses 22 and 26. It should be noted that the angle $\theta$ of the inclination relative to the diametrical line may be 10° to 45° and preferably 20° to 30°.

With the legs 22a and 26a of the steel strips having the faced surfaces inclined in this manner, when the steel strips are wound to form the first and second layer portions 20 and 24, the outer steel strip for the second layer portion 24 is never stranded on the lower steel strip for the first layer portion 20 because the outer steel strip for the second layer portion 24 slides along the inclination of the legs 22a and 26a so that they are positively engaged with each other as shown in FIG. 3. The larger gap between the adjacent turns of the second layer portion 24 can be accomplished by the steel strip for the second layer portion 24 having a smaller width than that of the steel strip for the first layer portion 20. It should be noted that this causes the flexible pipe 10 to have increased flexibility without lowering the resistance to the longitudinal tensile and also to the circumferential force. If the angle θ of the inclination of the legs 22a and 26a is smaller than 10°, then it will be difficult to engage the legs 26a of the outer steel strip for the second layer portion 24 with those of the lower steel strip for the first layer portion 20 because the legs 26a strike against the legs 22a when the spiral pitches of the outer and inner steel strips for the first and second layer portions 20 and 24 fall into disorder. On the other hand, if the angle θ of the inclination of the legs 22a and 26a is larger than 45°, when bending and/or longitudinal forces are applied to the first and second layer portions, the outer steel strip for the second layer portion 24 will slide on the inner steel strip for the first layer portion 20 so that the legs 26a of the outer steel strip for the second layer portion 24 are disengaged from those of the inner steel strip for the first layer portion 20 due to weaker engagement of the legs 22a with the legs 26a. This causes the flexible pipe 10 to have a weaker strength and also to have a shorter life. Furthermore, if the angle θ of the inclination is larger than 45°, when the spiral pitches of the first and second layer portions fall into disorder, it is difficult to make the legs 26a of the outer steep strip engage the legs 22a of the inner steel strip because the adjacent legs 22a of the inner steel strip cannot be moved close to each other by the legs 26a of the outer steel strip even though the adjacent legs 22a of the inner steel strip try to enter the recess 26 of the outer steel strip. Thus, it will be noted that the angle θ of the inclination may range from 10° to 45°. If the angle θ ranges from 20° to 30°, then this is preferable because the outer steel strip will be positively engaged with the inner steel strip and never slide on the inner steel strip. Also, it will be noted that the inclination of the legs 22a and 26a prevents them from being deformed because no concentration of stress occurs at the corners of the legs on the steel strips for the first and second layer portions 20 and 24. Thus, the steel strips for the first and second layer portions 20 and 24 are never cracked.

As noted from FIG. 3, the outer steel strip for the second layer portion 24 is thicker than the lower steel strip for the first layer portion 20. It should be noted that the thinner inner steel strip for the first layer portion 20 together with the smaller gap thereof prevents the flexible pipe 10 from hindering its flexibility while the thicker outer steel strip for the second layer portion 24 causes the flexible pipe 10 to have much resistance to internal pressure due to the fluid flowing through the flexible pipe 10. Also, it should be noted that the smaller gap of the first layer portion 20 prevents material of the internal plastic sheath from coldly flowing into the gaps between the adjacent turns of the first layer portion 20. Thus, it will be noted that the internal plastic sheath 12 is never damaged.

In one example, the internal plastic sheath 12 is formed of polyethylene while the external plastic sheath 18 is formed of polyvinyl chloride. On the other hand, the armor layers 14 and 16 are formed of steel. The long pitched armor layer 16 is in the form of wire. The inner steel strip for the first layer portion 20 has a thickness of 4.8 mm while the outer steel strip for the second layer portion 24 has a thickness of 9.6 mm. The depth of the recesses 22 and 26 of the steel strips for the first and second layer portions 20 and 24 is 1.6 mm while the width dimension of the inclined surfaces of the legs 22a and 26a is 0.7 mm. Thus, the angle θ of the inclination is 23.6°.

As also noted from FIG. 3, the space between the internal and external plastic sheaths 12 and 18 may be preferably filled with lubricant 27 which may be painted onto or adhered to the steel strips for the first and second layer portions 20 and 24 and the steel wires or strips for the long pitched armor layer 16. The lubricant 27 may be liquid lubricant such as conventional lubricating oil. If otherwise, it may be solid lubricating powder such as talc or molybdenum sulfide, lubricating paste (grease) formed by dissolving and dispersing the solid lubricating powder with solvent or a composite lubricant of them. The lubricant 27 allows the flexible pipe 10 to be smoothly bent even though the gaps of the armor layers 14 and 16 are reduced or the metal surfaces of the armor layers are frictionally relatively moved thereof when the flexible pipe 10 is subject to bending. Thus, it will be noted that there is less abrasion and less production of heat, which prevents the metal material of the armor layers 14 and 16 from being damaged.

Although, in the illustrated embodiment, the short and long pitched armor layers may be formed of steel, which may be soft or hard, they may be formed of stainless steel or any other metal material.

It should be noted that the hardness of metal materials of the adjacent metal armor layers or layer portions is preferably different from each other. This prevents the adjacent metal armor layers or layer portions from being abraded due to their friction. The degree of difference between the hardness of metal materials is preferably more than 0.2 times on the Vicker's hardness scale. In one example, the armor layers 14 and 16 are formed of low carbon steel and have the following hardnesses.

| Armor layers or layer portions (numerals of FIG. 3) | Vicker's hardness scale |
| --- | --- |
| 20 | 240 |
| 24 | 200 |
| 16 (inner) | 250 |
| 16 (outer) | 180 |

Although, in the above example, the hardnesses of all the layers or layer portions are varied, only the layer or layer portion which tends to be abraded may have a varied hardness. For example, since the long pitched metal armor layer 16 (inner) tends to be abraded, it may have a hardness different from that of the other layer (outer) 16 or layer portions 20 and 24.

FIG. 4 shows a fitting 28 for the flexible pipe 10 of the invention. The external plastic sheath 18 at the end of the flexible pipe 10 is removed to expose the internal plastic sheath 12, the short pitched armor layer 14 and the long pitched armor layer 16. The fitting 28 comprises a fitting body 30 slidably mounted on the exposed end of the internal plastic sheath 12, a cap 32 threadedly engaged with the fitting body 30 to surround the exposed ends of the components of the flexible pipe 10, a first collar 34 disposed on the exposed end of the long pitched armor layer 14 which is folded back around the collar 34 and a second collar 36 disposed on the folded back end of the long pitched armor layer 14 so that the folded back end of the long pitched armor layer 14 is held between the first and second collars 34 and 36. A sealing ring 38 of polytetrafluoroethylene or rubber may be provided between the fitting body 30 and the exposed end of the internal plastic sheath 12 while a sealing ring 40 of polytetrafluoroethylene or rubber may be provided between the cap 32 and the external plastic sheath 18. A sealing plug 42 may be tightened by bolts 44 to the fitting body 30 to secure the sealing ring 38 in a fluid-tight manner while a sealing plug 46 may be tightened by bolts 48 to the cap 32 to secure the sealing ring 40 in a fluid-tight manner. A resin filler 50 such as epoxy resin, phenol resin, unsaturated polyester resin or the like may be filled in a space between the cap 32 and the exposed end of the flexible pipe 10. As noted from FIG. 4, since the components of the fitting 28 are separately disposed in a longitudinal direction, the diameter of the fitting 28 can be reduced. The fitting body 30, the cap 32, the collars 34 and 36 and the sealing plugs 42 and 46 may be formed of steel.

The fitting 28 of FIG. 4 may be assembled as follows. After the flexible pipe 10 is cut so as to have a predetermined length, the sealing plug 46, the sealing ring 40, the cap 32 and the collar 36 are sequentially put on the flexible pipe 10. Thereafter, the external plastic sheath 18 is cut at a predetermined length so as to expose the long pitched metal armor layer 16. The collar 34 is put on the exposed long pitched metal armor layer 16 and then the respective metal wires or strips of the long pitched metal armor layer 16 are folded back along the collar 34. Thereafter, the collar 36 is moved toward the collar 34 so that the metal wires or strips of the long pitched armor layer 16 are held between the collars 34 and 36. After that, the collar 36 at the right end thereof is welded to the long pitched armor layer 16. The metal wires or strips of the long pitched metal armor layer 16 may be welded to each other. Otherwise, the metal wires or strips of the long pitched metal armor layer 16 may be either welded to each other without welding them to the collar 36 or welded to the collar 34 together with or without welding them to each other or to the collar 36. Thereafter, the portions of the short pitched metal armor layer 14 are cut in a stepped manner. In this condition, the sealing plug 42, the sealing ring 38 and the fitting body 30 are sequentially put on the internal plastic sheath 12. After the fitting body 30 is placed on the internal plastic sheath 12 until the end of the internal plastic sheath 12 strikes against an inner shoulder of the fitting body 30, the sealing ring 38 is tightened by the bolts 44. The cap 32 is rightwardly moved while it is threadedly engaged with the fitting body 30. It should be noted that the threaded engagement of the cap 32 with the fitting body 30 may be preferably accomplished by rotating only the cap 32. Thereafter, the sealing plug 46 is tightened by the bolts 48 so that the sealing ring 40 is also tightened against the external plastic sheath 12 and the cap 32. The filler 50 is poured into the cap 32 through a pouring port, not shown, and the pouring port is closed by a plug, also not shown, to cure the filler 50.

FIG. 5 shows another embodiment of the invention in which the edges, corners and side faces of the metal strips for the first and second layer portions 20 and 24 are rounded. The rounded edges and corners of the metal strips prevent the legs 22a and 26a of the metal strips from concentration of stress and cause the engagement of the outer and inner metal strips to be more positively accomplished. Also, the rounded side faces of the metal strips prevent them from being buckled due to their local bending when the flexible pipe 10 is bent. Thus, it will be noted that the flexible pipe 10 can be uniformly bent.

Although some preferred embodiments of the invention have been illsutrated and described with reference to the accompanying drawings, it will be understood by those skilled in the art that they are by way of examples, and that various changes and modifications may be made without departing from the spirit and scope of the invention, which is intended to be defined only by the appended claims.

What is claimed is:

1. A flexible pipe comprising at least one internal plastic sheath, a spiraled short pitched metal armor layer provided on said internal plastic sheath, a long pitched metal armor layer provided on said short pitched metal armor layer, and an external plastic sheath provided on said long pitched metal armor layer, said short pitched metal armor layer including a first inner layer portion of spirally wound metal strip having inwardly and outwardly facing surfaces and having a recess provided in the outwardly facing surface thereof and a separate second outer layer portion of spirally wound metal strip having a recess provided in the inwardly facing surface thereof so that legs formed by said recess of said second layer portion are engaged across legs formed by the recess of each of adjacent turns of said first layer portion, and said legs of said metal strips for said first and second layer portions having said facing surfaces outwardly inclined toward the opening of the respective recess.

2. A flexible pipe as set forth in claim 1, wherein the angle of inclination of said legs, relative to a plane perpendicular to the longitudinal axis of the pipe, is 10° to 45°.

3. A flexible pipe as set forth in claim 2, wherein said angle of inclination of said legs is 20° to 30°.

4. A flexible pipe as set forth in claim 1, wherein the width of said metal strip for said second layer portion is smaller than that of said metal strip for said first layer portion so that a gap is formed between the adjacent turns of said second layer portions.

5. A flexible pipe as set forth in claim 1, wherein said metal strip for said first layer portion is thinner than that for said second layer portion.

6. A flexible pipe as set forth in claim 1, and further comprising a lubricant in the space between said internal and external plastic sheaths.

7. A flexible pipe as set forth in claim 1, wherein the hardness of at least one of the metal materials of adjacent layer or layer portions is different from that of the other metal material.

8. A flexible pipe as set forth in claim 7, wherein the degree of difference between the hardnesses of adjacent metal armor layers or layer portions is more than 0.2 times on the Vicker's hardness scale.

9. A flexible pipe as set forth in claim 1, and further comprising a fitting including a fitting body securely engaged with an exposed end of said internal plastic sheath, a first collar disposed to the rear of said fitting body and along which an exposed end of said long pitched armor layer is folded back, a second collar disposed so as to engage said folded back end of said long pitched armor layer, a cap provided across said external plastic sheath and said fitting body so as to surround said first and second collars together with said exposed end of said long pitched armor layer and an exposed short pitched armor layer, a filler with which a space within said cap is filled, and sealing means to seal a gap between said internal plastic sheath and said fitting body and also a gap between said cap and said external plastic sheath.

10. A flexible pipe as set forth in claim 1, wherein at least one of said first and second layer portions of said short pitched metal armor layer has side faces generally perpendicular to the respective facing surface thereof, said side faces being rounded.

11. A flexible pipe as set forth in claim 10, wherein said side faces merge with said respective facing surfaces at edges which are rounded.

12. A flexible pipe as set forth in claim 10, wherein said legs of said at least one layer portion merge with the respective recess in rounded filet corners.

13. A flexible pipe as set forth in claim 10, wherein said legs of both layer portions merge with the respective recess in rounded filet corners.

* * * * *

UNITED STATES PATENT AND TRADEMARK OFFICE
CERTIFICATE OF CORRECTION

PATENT NO. : 4,549,581

DATED : October 29, 1985

INVENTOR(S) : Yohei Unno et al.

It is certified that error appears in the above—identified patent and that said Letters Patent is hereby corrected as shown below:

Column 3, line 26, "steep" should be --steel--

Column 4, line 18, "thereof" should be deleted

Signed and Sealed this

Sixteenth Day of September 1986

[SEAL]

Attest:

DONALD J. QUIGG

Attesting Officer

Commissioner of Patents and Trademarks